US009058655B2

(12) United States Patent
Doepke et al.

(10) Patent No.: US 9,058,655 B2
(45) Date of Patent: Jun. 16, 2015

(54) REGION OF INTEREST BASED IMAGE REGISTRATION

(71) Applicant: Apple Inc., Cupertino, CA (US)

(72) Inventors: Frank Doepke, San Jose, CA (US); Marius Tico, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 13/670,080

(22) Filed: Nov. 6, 2012

(65) Prior Publication Data

US 2014/0126819 A1 May 8, 2014

(51) Int. Cl.
*G06K 9/32* (2006.01)
*G06T 7/00* (2006.01)

(52) U.S. Cl.
CPC .............. *G06T 7/0028* (2013.01); *G06T 7/0024* (2013.01); *G06T 2207/20012* (2013.01); *G06T 2207/20021* (2013.01); *G06T 2207/20104* (2013.01); *G06T 2207/30201* (2013.01)

(58) Field of Classification Search
CPC ..................................................... G06T 7/0024
USPC .................................. 382/173, 284, 292, 294
See application file for complete search history.

(56) References Cited

U.S. PATENT DOCUMENTS

| | | | | |
|---|---|---|---|---|
| 6,594,403 | B1 * | 7/2003 | Bozdagi et al. | 382/284 |
| 6,625,332 | B1 * | 9/2003 | Nakao | 382/294 |
| 2005/0201607 | A1 * | 9/2005 | Sato et al. | 382/131 |
| 2008/0170803 | A1 * | 7/2008 | Forutanpour | 382/284 |
| 2010/0124384 | A1 * | 5/2010 | Edgar et al. | 382/313 |
| 2010/0208997 | A1 * | 8/2010 | Xie et al. | 382/195 |
| 2011/0069906 | A1 * | 3/2011 | Park et al. | 382/284 |
| 2011/0211045 | A1 * | 9/2011 | Bollano et al. | 348/46 |
| 2011/0249889 | A1 * | 10/2011 | Kothandaraman et al. | 382/154 |
| 2013/0250123 | A1 * | 9/2013 | Zhang et al. | 348/164 |

OTHER PUBLICATIONS

Zhuo et al. ("On the Recovery of Depth from a Single Defocused Image," Computer Analysis of Images and Patterns Lecture Notes in Computer Science vol. 5702, 2009, pp. 889-897).*
Moghari et al. ("Global registration of multiple bone fragments using statistical atlas models: Feasibility experiments," IEEE 30th International EMBS Conference, Aug. 20-24, 2008).*
Liao, et al., "Multi-modal Image Registration Using the Generalized Survival Exponential Entropy," MICCAI 2006, LNCS 4191, pp. 964-971, Springer-Verlag, 2006.
Reinhard, et al., "High Dynamic Range Imaging: Acquisition, Display and Image-Based Lighting, Second Edition," Morgan Kaufmann, 2010.
Wolberg, et al., "Robust Image Registration Using Log-Polar Transform," Proc. of IEEE Intl. Conf. on Image Processing, Sep. 2000.

* cited by examiner

*Primary Examiner* — Yubin Hung
(74) *Attorney, Agent, or Firm* — Wong, Cabello, Lutsch, Rutherford & Brucculeri, LLP

(57) ABSTRACT

Techniques for registering images based on an identified region of interest (ROI) are described. In general, the disclosed techniques identify a region of ROI within an image and assign areas within the image corresponding to those regions more importance during the registration process. More particularly, the disclosed techniques may employ user-input or image content information to identify the ROI. Once identified, features within the ROI may be given more weight or significance during registration operations than other areas of the image having high-feature content but which are not as important to the individual capturing the image.

27 Claims, 6 Drawing Sheets

REGION OF INTEREST BASED IMAGE REGISTRATION

BACKGROUND

This disclosure relates generally to the field of image processing. More particularly, but not by way of limitation, this disclosure relates to a technique for improving image registration operations by giving more weight or significance to regions within an image deemed to be more important.

Image registration is the process of overlaying two or more images of the same scene taken at different times, from different viewpoints, and/or by different sensors. The goal of image registration is to align two images—the reference and sensed images—so that when they are combined or blended together, they appear as a seamless whole (rather than as a combination of disjoint images). One approach, known as feature-based registration, seeks to identify unique features in both the reference and sensed images (e.g., edges, line endings, centers of gravity and the like). The correspondence between the two sets of detected features then drives image alignment.

During image registration, the use of foreground imagery versus background imagery can produce different results, where the selection of one can lead to visually poor results. This problem can arise, for example, because of parallax. Consider the capture of an individual's portrait using a multi-image capture technique such as high dynamic range (HDR) imaging. In such cases, the individual is most often close to the camera while the background is far away (e.g., a tree line). Here, a small camera motion will cause the individual's face to move in relation to the edge of the frame more than the background tree-line. Unfortunately, trees can provide a stronger signature for registration than would the individual's face. (The same is true for any background having a large number of detectable edges, line endings and the like compared to the foreground subject.) Automatic feature-based registration techniques would use the background for registration purposes and, as a result, ghosting of the foreground subject (e.g., the individual's face) would exhibit ghosting.

SUMMARY

In one embodiment the inventive concept provides methods, non-transitory programmable storage devices and devices align digital images based on a weighted region of interest (ROI). One illustrative method includes receiving an image that is, or has been, partitioned into multiple portions or tiles. For each portion or tile, an alignment value and associated confidence value for a registration parameter may then be obtained. Example registration parameters include, but art not limited to, translation and rotation motions. A ROI may then be identified that overlaps with, or is coincident to, one or more of the tile areas. Offset values for each tile may then be determined based, at least in part, on each tile's alignment value, associated confidence value and a weight value in accordance with this disclosure. The weight value may, for example, be a value that is larger for tiles coincident with the ROI than it is for image portions that are not coincident with the ROI. An overall or image alignment value based, at least in part, on each tile's offset value for the registration parameter may then be determined and the image registered with a prior obtained image in accordance with that value.

In various embodiments, the number of tiles may be varied as may the procedure used to determine a tile's weight value. In one embodiment, a tile's weight value may be one value if it is not coincident with the ROI and another value if it is. In another embodiment, a tile's weight value may be a function of the amount of the tile's area that is coincident with the ROI. In other implementations, certain tile offset values may be excluded from determination of a final image alignment value because they are deemed to be unreliable.

DETAILED DESCRIPTION

This disclosure pertains to systems, methods, and computer readable media to improve image registration. In general, techniques are disclosed for identifying a region of interest (ROI) within an image and assigning areas within the image corresponding to those regions more importance during the registration process. More particularly, techniques disclosed herein may use user-input or image content information to identify the ROI. Once identified, features within the ROI may be given more weight or significance during registration operations than other areas of the image having high-feature content but which are not as important to the individual capturing the image.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

Figure 1:
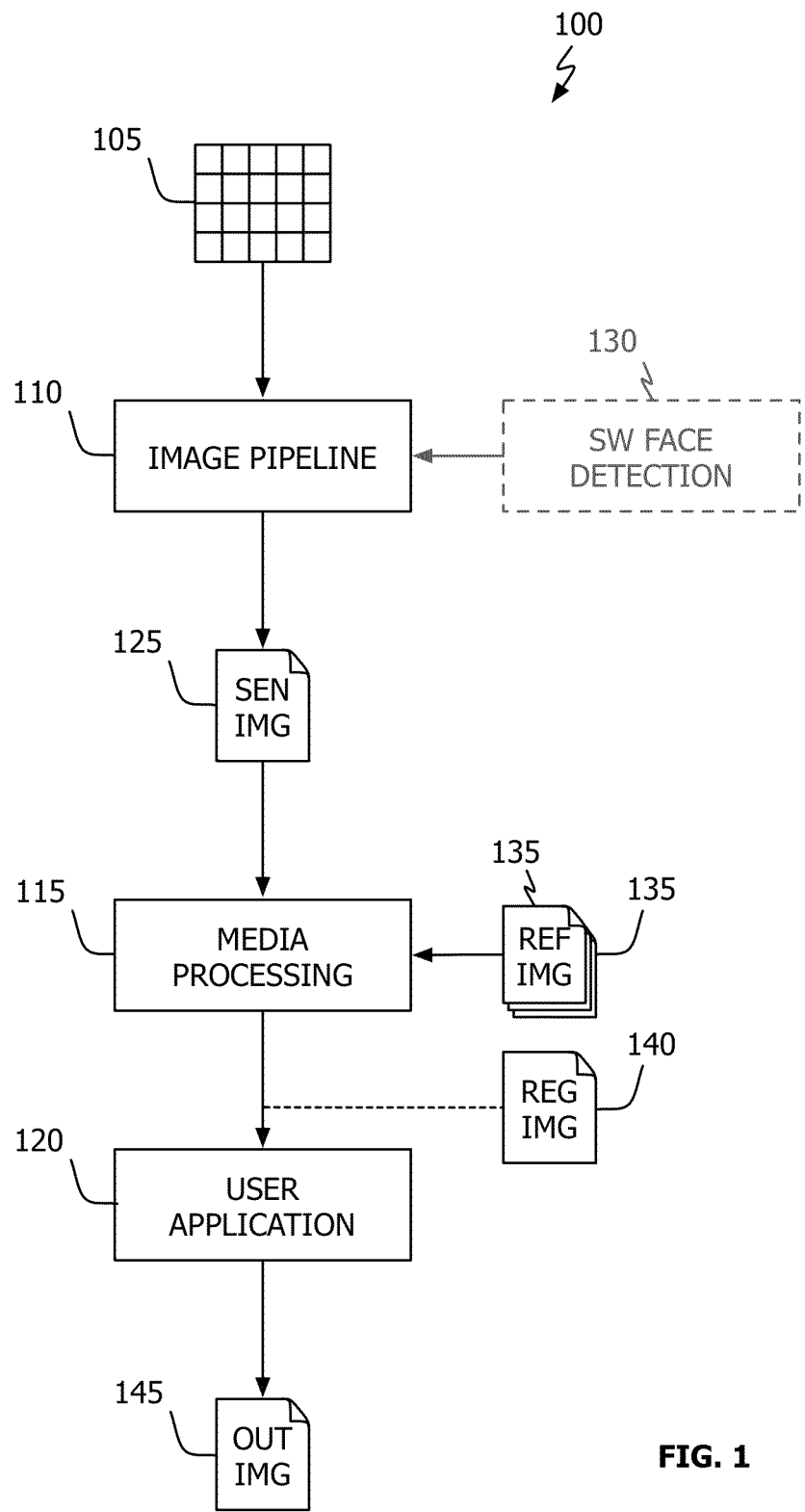
FIG. 1 shows, in flowchart form, an image capture and registration system in accordance with one embodiment.

Referring to FIG. 1, in one embodiment image capture and registration system 100 includes image sensor 105, hardware image processing pipeline 110 and functional modules that are typically, but not necessarily, implemented in software: media processing 115, and user application 120. In operation, image sensor 105 provides raw data to image pipeline 110 which, in response, generates sensed image 125 (e.g., a 4:2:0 YCbCr or an 8-bit RGB image). In some embodiments image processing pipeline 110 can provide a number functions including, for example, deBayering, noise reduction, bad pixel compensation, sharpening, white balance determination, auto-exposure (AE), auto-focus (AF), dynamic range control, and certain face recognition capabilities. In one embodiment, image processing pipeline 110 may also send output to, and receive input from, software face recognition module 130. In the end, sensed image 125 includes not only data representing the captured scene (i.e., processed data from sensor 105), but metadata. Image metadata may include, without limitation, orientation and movement data, information about possible user input, and face and other object recognition information. User input metadata could, for example, indicate where on the image capture device's preview display the user tapped. Face and object recognition metadata may include one or more areas (e.g., designated via bounding boxes) within the image that have been determined to include a face or some other a priori identified object. Illustrative objects may include, for example, foreground objects such as cars, houses, and (large) flowers.

Media processing module 115 registers sensed image 125 to one or more reference images 135 to produce registered image 140. In an embodiment targeted for implementation on a mobile device executing the iOS™ operating system, media processing module 115 may be a framework that provides a low-level programming interface for managing and playing audiovisual media. (iOS is a trademark of Apple Inc.) One such framework is the Core Media framework. Once registration is complete, the registered image may be passed to user application 120 that may then further manipulate the image to generate final output image 145. In one embodiment, user application 120 could be an image processing application such as Aperture® or iPhoto®. (APERTURE and iPHOTO are registered trademarks of Apple Inc.)

Figure 2:
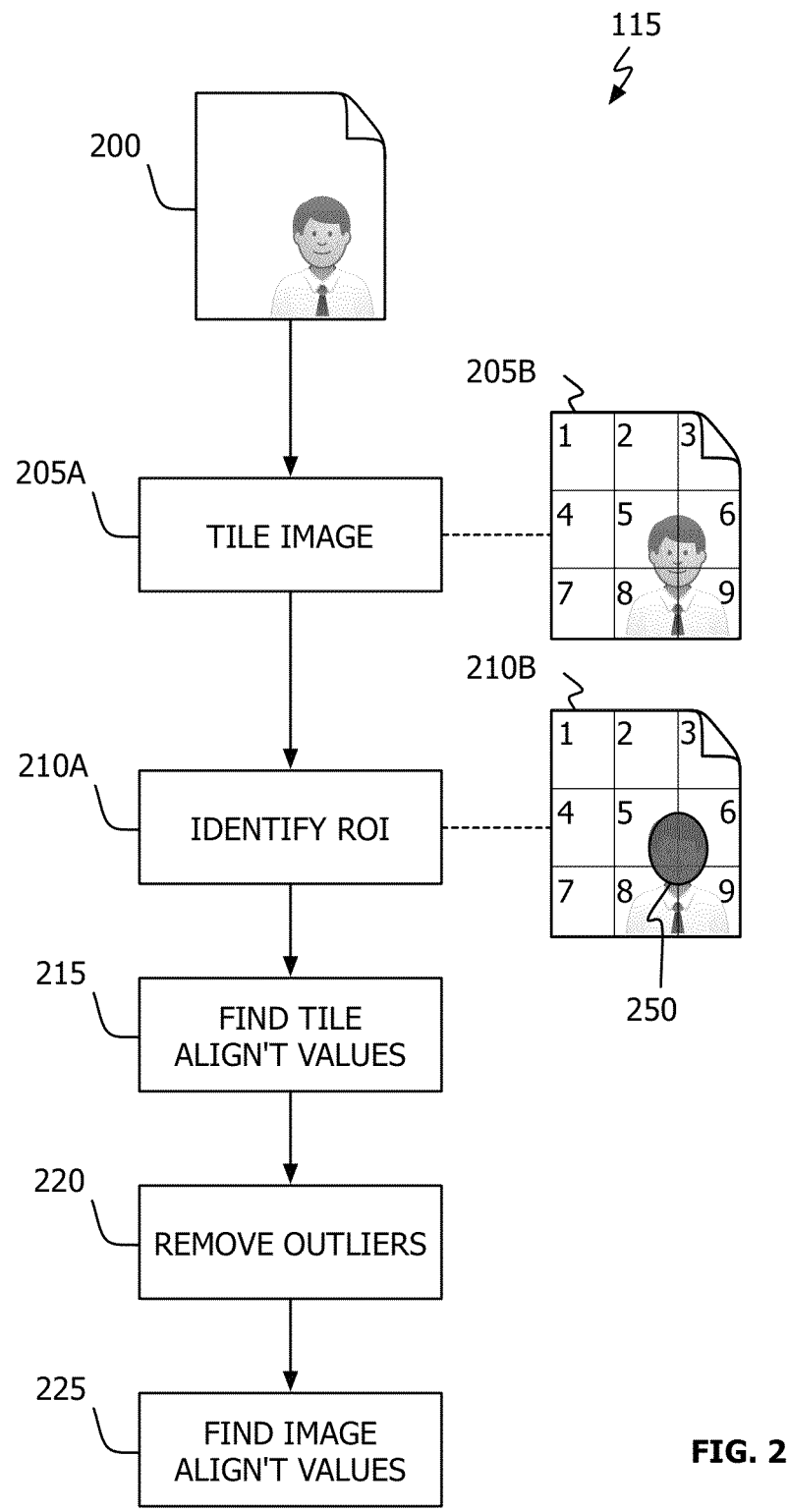
FIG. 2 shows, in flowchart form, a media processing operation in accordance with one embodiment.

Referring to FIG. 2, media processing in accordance with one embodiment of block 115 begins when sensed image 200 is received. Once received, sensed image 200 may be tiled as illustrated by 205B (block 205A). In the current example, sensed image 200 has been partitioned into 9 tiles (an actual implementation may use more or fewer tiles). In general, tiles represent non-overlapping areas of an image. After tiling, a Region of Interest (ROI) may be identified (block 210A). Element 210B identifies a detected face's area as ROI 250 and is coincident to (i.e., overlaps with) portions of four (4) tiles: 5, 6, 8, and 9.

Figure 3:
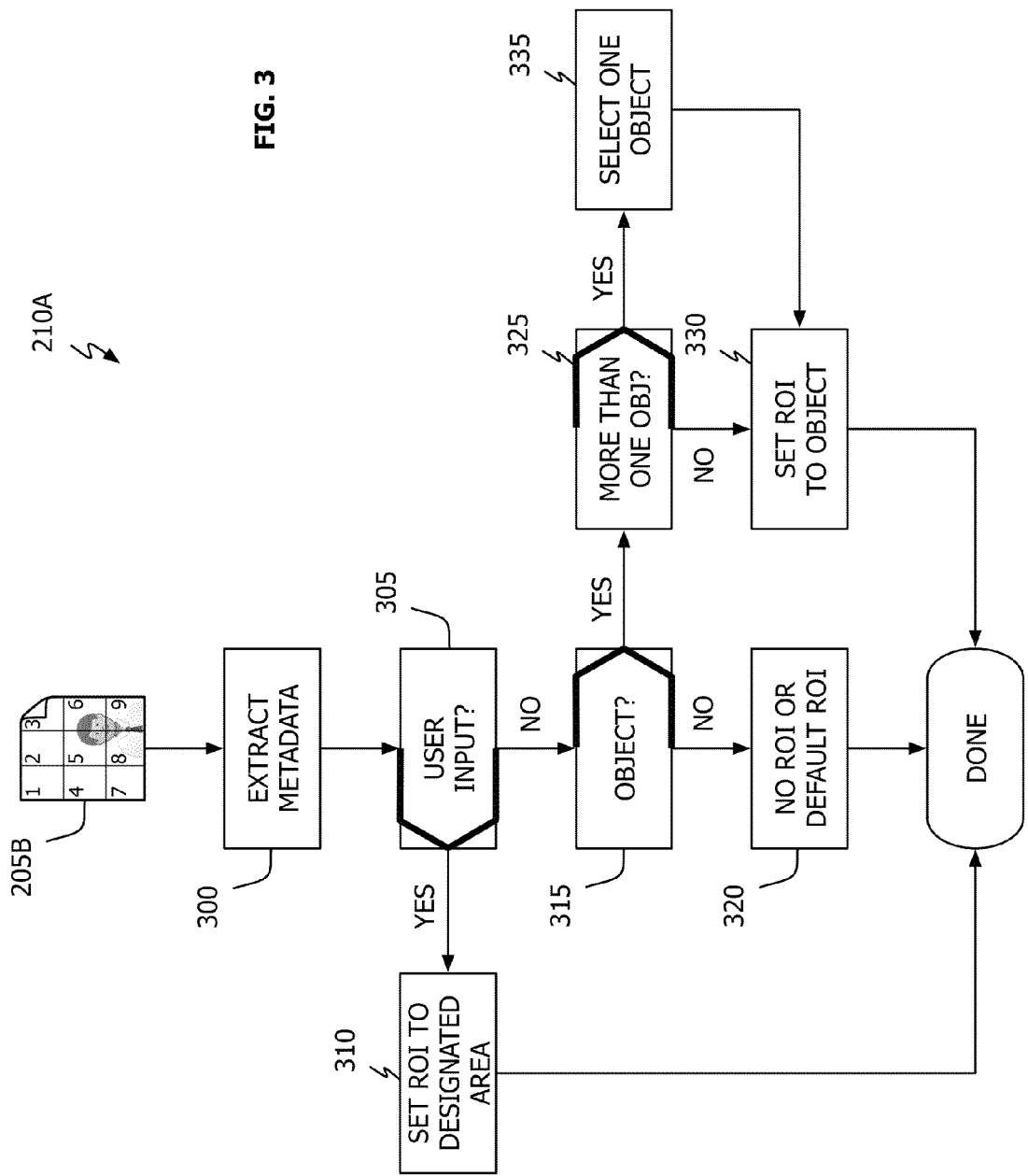
FIG. 3 shows, in flowchart form, a region of interest identification operation in accordance with one embodiment.

Referring to FIG. 3, in one embodiment metadata may be extracted from sensed image 200 (not shown) or tiled image 205B (block 300). In another embodiment, image metadata may be obtained from a separate data store such as, for example, an image library. If the metadata indicates receipt of user input such as, for example, a user's tap on a preview screen of an image capture device (the "YES" prong of block 305), ROI 250 may be set to the identified area or region (block 310); the assumption being that user input manifests a user's explicit designation of an important region. If the image metadata does not identify user input (the "NO" prong of block 305), a further check may be made to determine if an a priori determined type of object has been identified (e.g., faces, automobiles, bicycles, chairs and doors). In one embodiment, object recognition may be performed by image processing pipeline 110. In another embodiment, image processing pipeline 110 operations may be augmented by input from one or more other modules such as software face recognition module 130 and/or stored data (e.g., an object model database). If the metadata indicates that no recognizable object has not been found or identified (the "NO" prong of block 315), no ROI or a default ROI may be set (block 320). One illustrative default ROI may be an image's central region (the size of which may be implementation specific). Another illustrative default ROI may be the area identified by the auto-focus (AF) and/or auto-exposure (AE) modules or circuits. If an object was identified (the "YES" prong of block 315), yet another check may be made to determine if more than one object has been identified (block 325). If the image's metadata identifies only a single object (the "NO" prong of block 325), ROI 250 may be set to coincide with the identified object's area in the image (block 330). If the image contains more than one identified object (the "YES" prong of block 325), one of the identified objects may be selected (block 335) whereafter ROI 250 may be set to coincide with the selected object's area in the image (block 330). In another embodiment, two or more identified objects may be used to set an ROI in accordance with this disclosure. For example, if two objects were identified with the same level of certainty, both ROIs may be used.

Returning to FIG. 2, with ROI 250 identified, alignment values (and confidence values for those alignment values) for each tile and for one or more registration parameters may be determined in accordance with any desired technique (block 215). As used herein, the phrase "registration parameter" refers to a type of alignment operation. For example, a linear translation (e.g., along an arbitrary x-axis or y-axis), a rotation operation (in plane and out of plane, e.g., "tilt"), or scale. Illustrative algorithms suitable for operations in accordance with block 215 include, but are not limited to, the Scale-invariant feature transform (SIFT), the Harris & Stephens/Plessey/Shi-Tomasi algorithm, the Marr-Hildreth algorithm, and the Canny algorithm.

Those tile alignment values that are deemed "outliers" may be discarded (block 220). What constitutes an outlier may depend on the type of implementation being pursued. In general, outlier tiles may be those tiles that produced registration parameters that are far different than the registration parameters of the other tiles. Outlier detection may be provided through statistical analysis. From the collection of remaining tile alignment values, final offset and confidence values for each of the one or more registration parameters may be determined for the image as a whole (block 225). It has been discovered that weighing tiles that include, overlap or are coincident with ROI 250 (e.g., tiles 5, 6, 8 and 9 in image 210B) more than those tiles that do not include or overlap ROI 250 (e.g., tiles 1-4, and 7 in image 210B) can overcome registration problems caused by a feature detector algorithm locking in on a region of high edge count, but which is not of import to the person capturing the image. By way of example, modified tile weighting in accordance with this disclosure may be accomplished as follows:

$$R_f = \frac{\sum_{i=1}^{N} c_i w_i R_i}{\sum_{i=1}^{N} c_i w_i}, \qquad \text{EQ. 1}$$

where $R_f$ represents the final registration parameter's offset or alignment value (e.g., move three pixels in the positive x-axis direction, or rotate 2.3° counter-clockwise), N represents the number of tiles (after outlier removal, if any), $R_i$ represents the registration parameter offset value for the i-th tile, $c_i$ represents the feature detector algorithm's confidence value for the i-th tile, and $w_i$ represents a tile weight assigned in accordance with this disclosure—the tile's ROI weight. While not necessary, the denominator of EQ. 1 provides registration parameter offset values ($R_f$) that are normalized with respect to an image's total weight.

In one embodiment, the value of $w_i$ may be a single real number (integer or floating point). For example, the value of $w_i$ may result from a function that takes into account camera-specific characteristics. In another embodiment, the value of $w_i$ may be a function of camera sensor input. In yet another embodiment, $w_i$ may be an empirical parameter that the developer may "tune" to meet the needs of her implementation. In still another embodiment, the size of the ROI with respect to the overall image size may change the weighting parameter. In still another embodiment, tiles in the center region of an image frame may be weighted more heavily than tiles on the image's periphery. In general, a developer may assign weights based on a tile's location in accordance with any pattern they need or want for their implementation (e.g., center tiles weighted more heavily, peripheral tiles weighted more heavily, a band of tiles across the image frame, etc.). In one embodiment, a tile's ROI weight may be assigned a default weight of 1.0, where those tiles coincident with the identified ROI have this value increased. In one such embodiment, each tile coincident with the ROI may have its ROI weight value increased to 2.0. In another embodiment, each tile coincident with the ROI may have its ROI weight increased as a function of the area of the tile which the ROI covers: e.g., 1.25 if the ROI covers 25% of the tile; 1.5 if the ROI covers 50% of the tile and so on. In practice, the manner in which a tile's ROI weight is increased may be "tunable." That is, selected by the system designer to achieve their goals.

Figure 4:
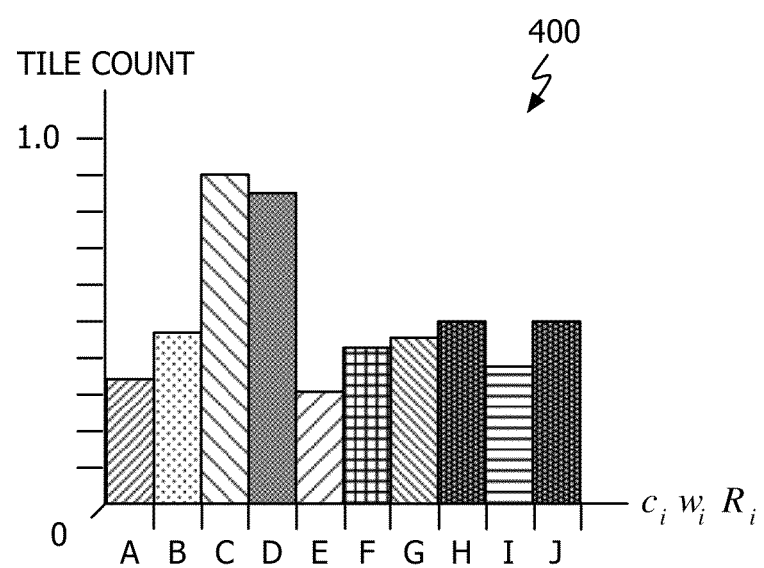
FIG. 4 shows an illustrative histogram in accordance with one embodiment.

In one embodiment, acts in accordance with block 220 may be deferred until operations in accordance with block 225. In one such illustrative embodiment, registration parameter statistics built-up or generated during evaluation of EQ. 1 may be used to identify outlier tiles. One approach to identifying outlier tiles in accordance with this approach may be seen in FIG. 4. There, histogram 400 shows all values of $(c_i w_i R_i)$ calculated during evaluation of EQ. 1's numerator for an illustrative implementation. Tiles corresponding to $(c_i w_i R_i)$ values C and D may be designated as outliers and removed before a final image registration parameter offset or alignment value is determined. By way of example, all tiles that are more than a specified value above or below the mean average of all $(c_i w_i R_i)$ values may be designated as outliers. In another embodiment, the median may be used. In still another embodiment, a tile list sorted by confidence values may be used; the bottom-most "M" tiles may then be discarded. It is noted, histogram 400 may use any "bin size" the designer deems necessary. As used here, "bin size" refers to the level of quantization $(c_i w_i R_i)$ values are given along histogram 400's abscissa.

Figure 5:
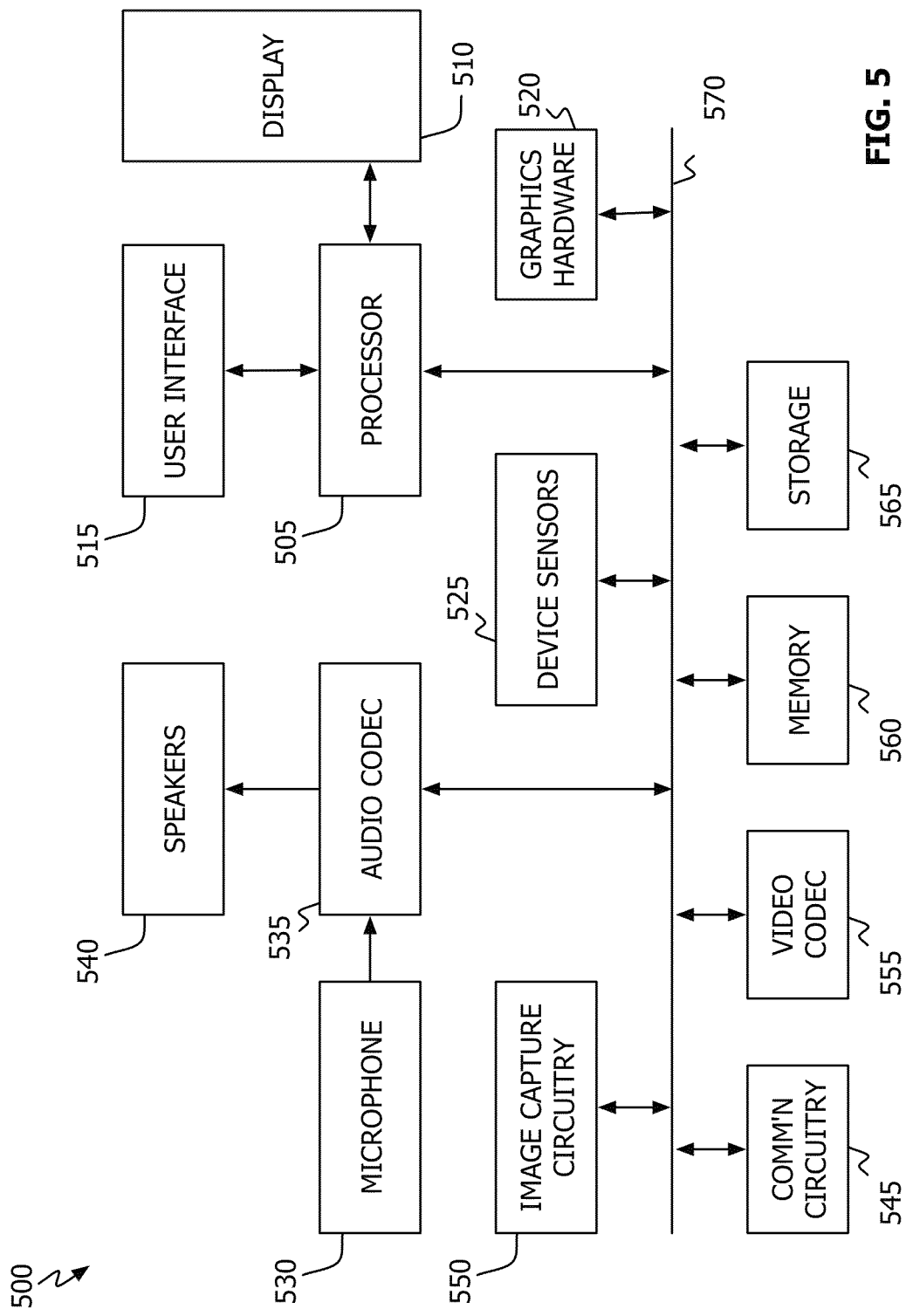
FIG. 5 shows, in block diagram form, a multi-function electronic device in accordance with one embodiment.

Referring to FIG. 5, a simplified functional block diagram of illustrative electronic device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, image capture circuit or unit 550, video codec(s) 555, memory 560, storage 565, and communications bus 570.

Processor 505 may execute instructions necessary to carry out or control the operation of many functions performed by device 500 (e.g., such as the generation and/or processing of images in accordance with FIGS. 1, 2 and 3). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may indicate a ROI in accordance with FIG. 2. Processor 505 may be a system-on-chip such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs).

Image capture circuitry 550 may capture still and video images that may be processed to generate images and may, in accordance with this disclosure, include image processing pipeline 110. Output from image capture circuitry 550 may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505, graphics hardware 520, and image capture circuitry 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505 such computer program code may implement one or more of the methods described herein.

Figure 6:
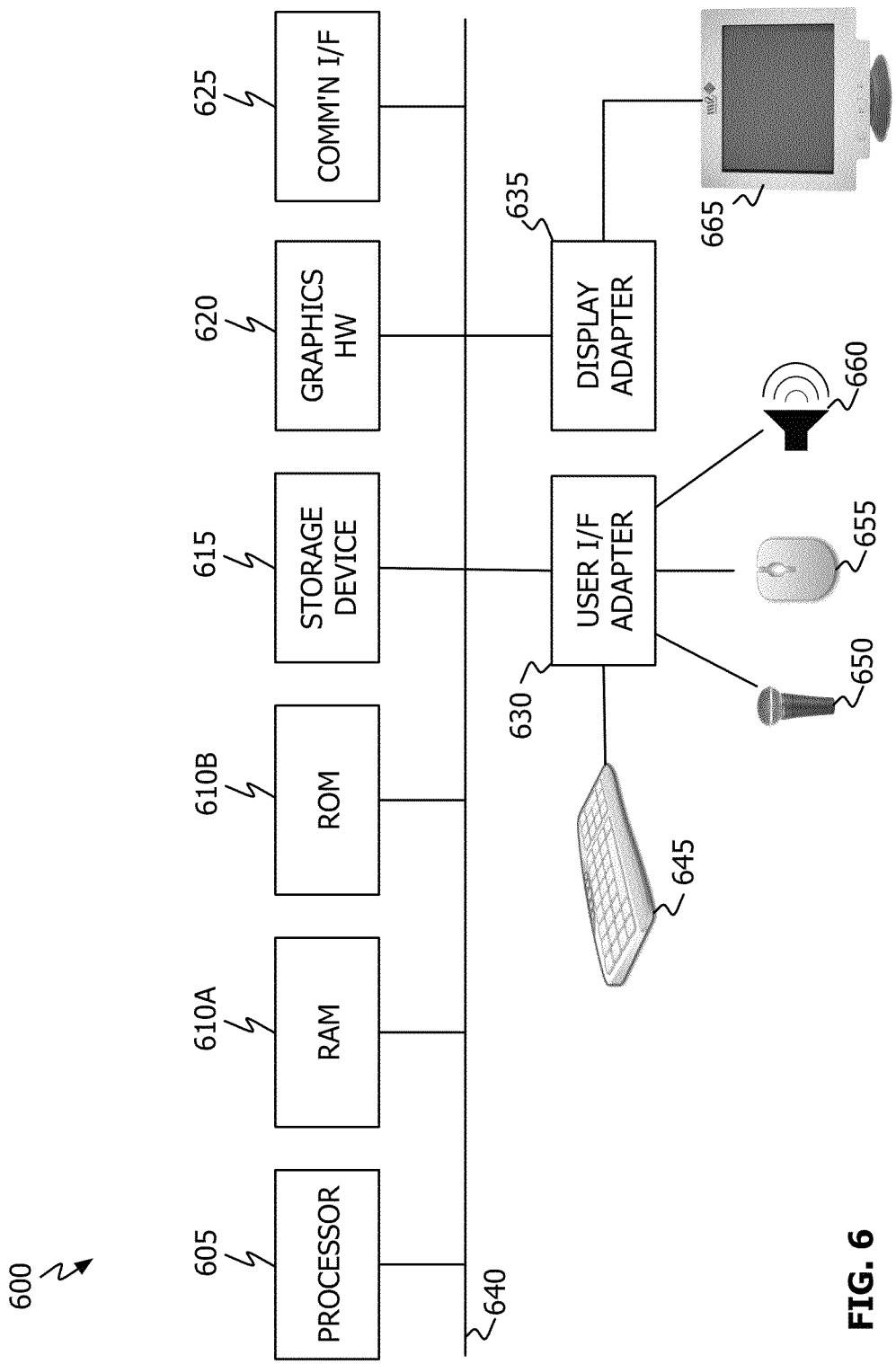
FIG. 6 shows, in block diagram form, a computer system in accordance with one embodiment.

Referring to FIG. 6, representative computer system 600 (e.g., a general purpose computer system or a dedicated image processing workstation) may include one or more processors 605, memory 610 (610B and 610B), one or more storage devices 615, graphics hardware 620, device sensors 625 (e.g., proximity sensor/ambient light sensor, accelerometer and/or gyroscope), communication interface 630, user interface adapter 635 and display adapter 640—all of which may be coupled via system bus or backplane 645. Memory 610 may include one or more different types of media (typically solid-state) used by processor 605 and graphics hardware 620. For example, memory 610 may include memory cache, read-only memory (ROM), and/or random access memory (RAM). Storage 615 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 610 and storage 615 may be used to retain media (e.g., audio, image and video files), preference information, device profile information, computer program instructions organized into one or more modules and written in any desired computer programming language, and any other suitable data. When executed by processor 605 and/or graphics hardware 620 such computer program code may implement one or more of the methods described herein. Communication interface 630 may be used to connect computer system 600 to one or more networks. Illustrative networks include, but are not limited to: a local network such as a USB network; a business' local area network; or a wide area network such as the Internet and may use any suitable technology (e.g., wired or wireless). User interface adapter 635 may be used to connect keyboard 650, microphone 655, pointer device 660, speaker 665 and other user interface devices such as a touchpad and/or a touch screen (not shown). Display adapter 640 may be used to connect one or more display units 670.

Processor 605 may be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 process graphics information. In one embodiment, graphics hardware 620 may include one or more programmable graphics processing unit (GPU) and other graphics-specific hardware (e.g., custom designed image processing hardware). Operations described herein attributable to image processing pipeline 110 may be performed by one, or both, of processor 605 and graphics hardware 620.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). For example, some of the operations outlined in FIGS. 1 and 2 may be combined into a single operation, others may be divided into additional operations, and still others may be performed in an order different from that shown. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable program storage device, readable by a processor and comprising instructions stored thereon to cause one or more processors to:
   receive an image having a plurality of portions, wherein each portion corresponds to an area of the image;
   obtain, for each portion, a confidence value and an alignment value for a first registration parameter;
   identify a region of interest for the image that is coincident to one or more of the portions;
   determine, for each portion, an offset value for the first registration parameter that is based, at least in part, on a combination of the portion's confidence value, alignment value and an associated weight value, wherein the weight value is larger for image portions coincident with the region of interest than it is for image portions that are not coincident with the region of interest;
   determine an image alignment value for the first registration parameter based, at least in part, on a combination of the offset values for each of the portions; and
   register the image with a prior received image based, at least in part, on the image alignment value for the first registration parameter.

2. The non-transitory computer readable program storage device of claim 1, wherein the first registration parameter corresponds to a linear translation registration parameter.

3. The non-transitory computer readable program storage device of claim 1, wherein the first registration parameter corresponds to a rotational registration parameter.

4. The non-transitory computer readable program storage device of claim 1, wherein each portion corresponds to a non-overlapping area of the image.

5. The non-transitory computer readable program storage device of claim 1, wherein the instructions to cause the one or more processors to identify a region of interest comprise instructions to cause the one or more processors to:
   obtain metadata associated with the image;
   determine the metadata identifies an area corresponding to one or more specified types of objects;
   select one of the one or more objects; and
   set the region of interest to the area corresponding to the selected object.

6. The non-transitory computer readable program storage device of claim 5, wherein the specified types of objects comprise faces.

7. The non-transitory computer readable program storage device of claim 1, wherein the weight value for each portion is directly proportional to the portion's area that is coincident with the region of interest.

8. The non-transitory computer readable program storage device of claim 1, wherein the weight value for each portion is based on a tile's position within the image frame.

9. The non-transitory computer readable program storage device of claim 8, wherein the weight value of a tile in the center region of an image is weighted more heavily than a tile on the image's periphery.

10. The non-transitory computer readable program storage device of claim 1, wherein the instructions to cause the one or more processors to determine an offset value comprise instructions to cause the one or more processors to determine, for each portion, a value equal to the portion's: (confidence value).times.(alignment value).times.(weight value).

11. The non-transitory computer readable program storage device of claim 1, wherein the instructions to cause the one or more processors to determine an image registration parameter value comprise instructions to cause the one or more processors to determine a normalized sum of the plurality of alignment values.

12. The non-transitory computer readable program storage device of claim 1, wherein the instructions to cause the one or more processors to determine an image registration parameter value comprise instructions to cause the one or more processors to:
   identify one or more outlier offset values from the plurality of offset values; and
   determine an image alignment value for the first registration parameter based, at least in part, on the plurality of offset values sans the outlier offset values.

13. The non-transitory computer readable program storage device of claim 12, wherein the image alignment value comprises a normalized sum of the plurality of offset values sans the outlier offset values.

14. The non-transitory computer readable program storage device of claim 1, further comprising instructions to cause the one or more processors to:
obtain, for each portion, an additional confidence value and an additional alignment value for each of one or more additional registration parameters;
determine, for each portion, an additional offset value for each of the one or more additional registration parameters based, at least in part, on a combination of the portion's additional confidence value, alignment value and an additional weight value for each of the one or more additional registration parameters, wherein the additional weight values are larger for image portions coincident with the region of interest than it is for image portions that are not coincident with the region of interest.

15. The non-transitory computer readable program storage device of claim 14, wherein the instructions to cause the one or more processors to determine an image alignment value for the first registration parameter further comprise instructions to cause the one or more processors to determine an additional image alignment value for each of the one or more additional registration parameters.

16. The non-transitory computer readable program storage device of claim 15, wherein the instructions to cause the one or more processors to register the image further comprise instructions to cause the one or more processors to register the image with the prior received image in accordance with the additional image alignment values of each of the one or more additional registration parameters.

17. An electronic device, comprising:
an image capture unit;
a memory coupled to the image capture unit; and
one or more processors operatively coupled to the image capture unit and memory and configured to execute instructions stored in the memory to:
receive an image from the image capture unit,
partition the image into a plurality of portions, wherein each portion corresponds to an area of the image,
obtain, for each portion, a confidence value and an alignment value for a registration parameter,
identify a region of interest for the image that is coincident to one or more of the portions,
determine, for each portion, an offset value for the registration parameter based, at least in part, on a combination of the portion's confidence value, alignment value and an associated weight value, wherein the weight value is larger for image portions coincident with the region of interest than it is for image portions that are not coincident with the region of interest,
determine an image offset value for the registration parameter based, at least in part, on a combination of the offset values for each of the portions, and
register the image with a prior received image in accordance with the image offset value.

18. The electronic device of claim 17, wherein the registration parameter corresponds to a linear translation registration parameter.

19. The electronic device of claim 17, wherein the instructions to cause the one or more processors to identify a region of interest comprise instructions to cause the one or more processors to:
obtain metadata associated with the image;
determine the metadata identifies an area corresponding to one or more objects of interest;
select one of the objects of interest; and
set the region of interest to the area corresponding to the selected object of interest.

20. The electronic device of claim 19, wherein the one or more objects of interest comprise faces.

21. The electronic device of claim 17, wherein the weight value for each portion is directly proportional to the portion's area that is coincident with the region of interest.

22. The electronic device of claim 17, wherein the instructions to cause the one or more processors to determine an image offset value comprise instructions to cause the one or more processors to:
identify one or more outlier offset values from the plurality of offset values; and
determine the image offset value based, at least in part, on the plurality of offset values sans the outlier offset values.

23. The electronic device of claim 17, further comprising instructions to cause the one or more processors to:
obtain, for each portion, an additional confidence value and an additional alignment value for each of one or more additional registration parameters;
determine, for each portion, an additional offset value for each of the one or more additional registration parameters based, at least in part, on a combination of the portion's additional confidence value, alignment value and an additional weight value for each of the one or more additional registration parameters, wherein the additional weight values are larger for image portions coincident with the region of interest than it is for image portions that are not coincident with the region of interest and
determine an additional image alignment value based on the registration parameter and each of the one or more additional registration parameters.

24. The electronic device of claim 23, wherein the instructions to cause the one or more processors to register the image further comprise instructions to cause the one or more processors to register the image with the prior received image in accordance with the additional image alignment values of each of the one or more additional registration parameters.

25. An image processing method, comprising:
receiving an image having a plurality of portions, wherein each portion corresponds to an area of the image;
obtaining, for each portion, a confidence value and an alignment value for a first registration parameter;
identifying a region of interest for the image that is coincident to one or more of the portions;
determining, for each portion, an offset value for the first registration parameter that is based, at least in part, on a combination of the portion's confidence value, alignment value and an associated weight value, wherein the weight value is larger for image portions coincident with the region of interest than it is for image portions that are not coincident with the region of interest;
determining an image alignment value for the first registration parameter based, at least in part, on a combination of the offset values for each of the portions; and
registering the image with a prior received image based, at least in part, on the image alignment value for the first registration parameter.

26. The method of claim 25, wherein identifying a region of interest comprises:
    obtaining metadata associated with the image;
    determining the metadata identifies an area corresponding to one or more specified types of objects;
    selecting one of the one or more objects; and
    setting the region of interest to the area corresponding to the selected object.

27. The method of claim 25, wherein the weight value for each portion is directly proportional to the portion's area that is coincident with the region of interest.

* * * * *